Patented Sept. 26, 1939

2,174,094

UNITED STATES PATENT OFFICE 2,174,094

CASEIN SOLUTION

Joseph Vincent Reardon, St. Louis, Mo., assignor to The Reardon Company, St. Louis, Mo., a corporation of Missouri No Drawing. Application November 2, 1934, Serial No. 751,186

5 Claims. (Cl. 134—46)

This invention relates generally to the treatment of casein, and particularly to casein solutions and the method of making the same for the production of water paints, sizes, etc.

Various efforts have heretofore been made to provide a water paint in dry powder form of the type mentioned having casein as the binder ingredient which, when mixed and applied to a surface produces a coating which is washable and which, when washed, will not be spotted by the water. Lime which has been generally employed for this purpose does not in fact produce a satisfactorily washable surface and lime containing paints have the decided disadvantage that they tend to crack and pull away in the form of leaves from the surface to which they are applied. Moreover lime renders the paint when mixed with water, so thin that the pigments tend to settle out.

In the use of casein as the binding ingredient of a water paint, particularly one which may be mixed and sold to the consumer in a dry powder form, thereafter to be incorporated with water, and in other uses of casein wherein the same is incorporated with water, it is necessary to employ an agent in the capacity of a solublizer for the casein, water alone not being capable of dissolving the casein to a practical extent. Heretofore lime has been one of the common solublizers for casein in this connection, but other alkaline materials have also been employed to some extent. Lime and other such alkaline materials when used with casein in a dry powder paint, however, have the disadvantage of precluding the use of colors and pigments which are not fast in the presence of such alkalis.

In the use of casein as a size in paper treating processes, particularly when the paper is to be colored, the same limitations exist as exist in water paints, in that certain colors, with which the paper is impregnated along with the casein solution, are not fast in the presence of the alkalis.

An object of this invention is to provide a composition containing casein and an agent which, upon drying of the casein solution will produce a substantially insoluble film which is washable and is not subject to spotting by water.

A further object of the present invention, is to provide a composition containing casein with a solublizer of such character that there is no limitation upon the character of colors which may be employed in connection with it.

Another object of this invention is to provide a water paint containing casein as a binding ingredient and having sufficient of a soluble aluminate to act both as a solublizer as well as an insolublizer for the casein.

A further object of the invention is to provide a casein size containing sufficient of a soluble aluminate to act as a solublizer and also as an insolublizer for the casein.

Other objects will become apparent to those skilled in the art when the following description is read:

In accordance with the present invention, generally stated, a casein solution may be formed for any desired purpose employing water together with a solublizing agent of substantially neutral reaction or so slightly alkaline or acid that no deleterious effects are encountered regardless of the colors which may be employed. Moreover, the same agent which acts as the solublizer may also render the coating resulting from the drying of the casein solution sufficiently insoluble that it may be washed and is not subject to spotting by water. The present invention particularly contemplates the use of water soluble aluminates in quantities sufficient to act as solublizers and/or insolublizers for casein and compositions in which casein is employed together with water. Examples of water soluble aluminates which may be employed are sodium aluminate, barium aluminate, and potassium aluminate in the proportion of from about 10% to about 100% by weight of the casein employed, depending upon the type of solution desired, the particular casein and the particular aluminate.

In carrying out the invention as applied to a dry powder paint composition, suitable amounts of pigment bases such as whiting gypsum or barytes, suitable amounts of fillers such as talc, clay and asbestine, and suitable amounts of opaque pigments such as zinc oxide, zinc sulphide, lithopone, titanium dioxide, etc., may be employed or they may be substituted by any desired dry color. In employing casein as the binder in paints of this character, a small amount of suitable preservative such as sodium fluoride and also a small amount of a foam allaying agent such as terpineol, sassafras, pine oil, kerosene or other mineral or essential oil are ordinarily employed and may be employed if desired in accordance with the present invention.

It will be understood, of course, that the pigments, pigment bases and fillers are ground to a fineness suitable for the purpose, that is to say, suspendable in a liquid so as to produce a paint which may be applied by brushing or spraying.

A typical dry powder paint of the character above mentioned may be produced in accordance with the present invention, employing the ingredients in the proportions indicated in the following table, giving one specific example and illustrative ranges of the various ingredients, it being understood that the ingredients are given merely by way of example and that appropriate well known substitutes may be employed:

|  | Specific | Range |
|---|---|---|
| Whiting | 60 | 0-90 |
| Talc | 20 | 0-90 |
| Zinc oxide | 20 | 0-90 |
| Casein | 10 | 5-20 |
| Sodium aluminate | 1.5 | .5-3 |
| Sodium fluoride or borax | .25 | 0-2 |
| Terpineol | .5 | 0-2 |

In the foregoing table the numerals represent parts by weight and it will be understood that the formula given is for a white paint, the whiting, zinc oxide or other pigment being substituted in part or in whole by the desired dry color if a colored point is desired. The sodium fluoride or borax acts to reduce the viscosity of the mixture and may, of course, be entirely omitted.

Other soluble aluminates than sodium aluminate may be employed. As mentioned above, barium aluminate, calcium aluminate and potassium aluminate, all of which are soluble in water, are suitable. For instance, in the above specific example nine parts of barium or calcium aluminate may be substituted for the sodium aluminate with good results, it being understood that the proportions given are for a good grade of casein having low acidity and that such optimum proportions vary with character and acidity of the casein and the type of aluminate employed.

In carrying out the invention for the production of a size, the soluble aluminate may be employed in the same proportion to the casein as that indicated above, that is to say, from about 10% to about 100%. The resultant mixture may when mixed with water to obtain the desired consistency to be applied as a size to paper or other material which it is desired to treat in accordance with the usual practice.

As a specific illustrative embodiment of such a size 100 parts of casein may be mixed with 15 parts of sodium aluminate and 0.5 part terpineol. If a pigmented size is desired 10-20 parts of pigment may be added. This produces a dry size which may be mixed with water to obtain the desired consistency.

From the foregoing description it is apparent that by the use of a soluble aluminate in connection with a casein solution not only is the resultant mixture of substantially neutral reaction so that there are no prohibitions as to the character of color which may be employed, but that the coating or film resulting from the application of such a solution is, after drying, of a truly washable character without tendency to crack, pull and lift. Hence the soluble aluminate may be characterized as both a solublizer and an insolublizer for the casein. Moreover, the superior solublizing action of the soluble aluminates results in a paint which is practically a colloidal solution with no tendency to thin or settle.

Although in the foregoing description this invention has been described with particular reference to dry powder paints and sizes, the invention is not limited to those particular fields of use, but is equally applicable in other relations where casein solutions are employed, such as in paste and liquid paints and paint bases. It is to be distinctly understood, therefore, that the invention is not limited to the specific details and proportions hereinbefore set forth, but that various modifications may be made, and that such modifications and such individual features and sub-combination of features as do not depart from the spirit of this invention are, although not specifically described herein, contemplated by and within the scope of the appended claims.

Having described the invention, what is claimed is:

1. A dry powdered paint composition which when mixed with water, applied and dried becomes washable comprising a binder constituent consisting of, casein and a water soluble aluminate active as both a solublizer and insolublizer for the casein and which is of substantially neutral reaction, the composition being substantially devoid of ingredients which after being mixed with water, applied and dried, are soluble in water.

2. A dry powdered paint composition which when mixed with water, applied and dried becomes washable comprising a binder constituent consisting of, casein, sodium aluminate, a preservative, and the balance materials substantially inert to casein, the composition being substantially devoid of ingredients which after being mixed with water, applied and dried, are soluble in water.

3. A dry powdered paint composition which when mixed with water, applied and dried becomes washable comprising, 5-20% casein, 0.5-3% soluble aluminate, and substantially the balance inert mineral pigment and filler, the composition being substantially devoid of ingredients which after being mixed with water, applied and dried, are soluble in water.

4. A dry powdered paint composition which when mixed with water, applied and dried becomes washable comprising, a binder constituent consisting of casein and barium aluminate, the composition being substantially devoid of ingredients which after being mixed with water, applied and dried are soluble in water.

5. A dry powdered paint composition which when mixed with water, applied and dried becomes washable comprising, a binder constituent consisting of casein and calcium aluminate, the composition being substantially devoid of ingredients which after being mixed with water, applied and dried are soluble in water.

JOSEPH VINCENT REARDON.